(12) United States Patent
Toi

(10) Patent No.: US 10,848,296 B2
(45) Date of Patent: Nov. 24, 2020

(54) RECEIVING APPARATUS AND METHOD

(71) Applicant: Toshiba Memory Corporation, Tokyo (JP)

(72) Inventor: Takashi Toi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/558,883

(22) Filed: Sep. 3, 2019

(65) Prior Publication Data
US 2020/0287702 A1    Sep. 10, 2020

(30) Foreign Application Priority Data

Mar. 7, 2019 (JP) ................. 2019-041866

(51) Int. Cl.
| | |
|---|---|
| H04L 7/00 | (2006.01) |
| H04L 12/26 | (2006.01) |
| H04B 17/21 | (2015.01) |
| H04L 27/06 | (2006.01) |

(52) U.S. Cl.
CPC .......... H04L 7/0037 (2013.01); H04B 17/21 (2015.01); H04L 27/06 (2013.01); H04L 43/087 (2013.01)

(58) Field of Classification Search
CPC ..... H04L 7/0037; H04L 27/06; H04L 43/087; H04B 17/21
See application file for complete search history.

(56) References Cited

U.S. PATENT DOCUMENTS

| | | | |
|---|---|---|---|
| 9,647,772 B2 | 5/2017 | Ide | |
| 10,103,911 B2 | 10/2018 | Shibasaki | |
| 2005/0238093 A1* | 10/2005 | Payne | ............ G01R 31/31715 375/224 |
| 2009/0238301 A1 | 9/2009 | Cheung | |
| 2020/0064401 A1* | 2/2020 | Lee | ................. G01R 31/31711 |

* cited by examiner

*Primary Examiner* — Kabir A Timory
(74) *Attorney, Agent, or Firm* — Kim & Stewart LLP (57) ABSTRACT

A receiving device includes first, second, and third circuits, and a processing circuit. The first circuit is configured to calculate a phase difference between a first clock signal and a data signal, which is a signal modulated by pulse-amplitude modulation. The second circuit is configured to generate a second clock signal based on the first clock signal and the phase difference. Jitter is added to second clock signal. The third circuit is configured to demodulate the data signal by comparing an amplitude of each pulse of the data signal with a threshold value at a timing synchronized to the second clock signal added the jitter. The processing circuit is configured to count the number of errors in the demodulated data signal and then calibrate the threshold value based on the counted number of errors.

20 Claims, 7 Drawing Sheets

RECEIVING APPARATUS AND METHOD

CROSS-REFERENCE TO RELATED APPLICATION

This application is based upon and claims the benefit of priority from Japanese Patent Application No. 2019-041866, filed Mar. 7, 2019, the entire contents of which are incorporated herein by reference.

FIELD

Embodiments described herein relate generally to a receiving device and a method.

BACKGROUND

Pulse-amplitude modulation (PAM) is a known data transmission method. In data transmission by pulse-amplitude modulation, an amplitude of a signal may have a plurality of states corresponding to different data values. A receiving device that receives a data signal modulated with pulse-amplitude modulation demodulates data from the data signal by comparing an amplitude of the data signal to predetermined threshold values corresponding to state boundaries.

The threshold values are selected to ensure that the data can be correctly demodulated. However, an enormous amount of time may be required to calibrate threshold values for guaranteeing reception with a bit error rate (BER) of less than $10^{-12}$.

DETAILED DESCRIPTION

Embodiments provide a receiving device that includes first, second, and third circuits, and a processing circuit. The first circuit is configured to calculate a phase difference between a first clock signal and a data signal, which is modulated by pulse-amplitude modulation. The second circuit is configured to generate a second clock signal based on the first clock signal and the calculated. Jitter is added to the second clock signal. The third circuit is configured to demodulate the data signal by comparing an amplitude of each pulse of the data signal with a threshold value at a timing synchronized to the second clock signal added the jitter. The processing circuit is configured to count the number of errors in the demodulated data signal and calibrate the threshold value based on the counted number of errors.

Hereinafter, a receiving device and a method according to example embodiments will be described with reference to accompanying drawings. The present disclosure is not limited by these example embodiments.

Example Embodiment

As an example, a receiving device for receiving a data signal modulated by a PAM4 modulation method, which is one type of pulse-amplitude modulation, will be described. With PAM4, an amplitude of the data signal may have four states each corresponding to different values. As such, the data signal modulated by PAM4 may transmit 2 bits of data for each symbol. For PAM4, three threshold values are used to determine the four states during demodulation. Hereinafter, a data signal modulated by PAM4 may be designated as a PAM4 signal.

Figure 1:
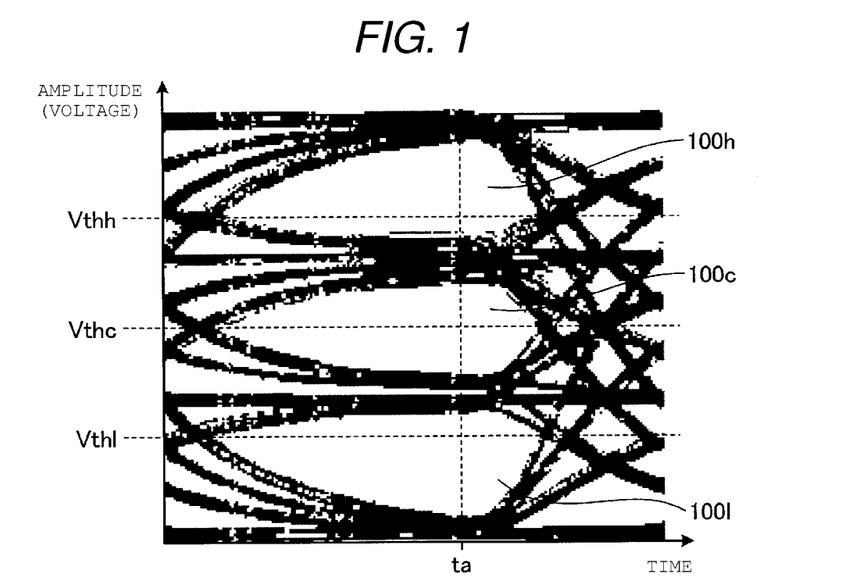
FIG. 1 is a schematic diagram illustrating an example of setting of three threshold values (Vthh, Vthc, and Vthl) used for demodulation of a PAM4 signal.

FIG. 1 is a schematic diagram illustrating an example of setting of three threshold values (Vthh, Vthc, and Vthl) used for the demodulation of the PAM4 signal. This FIG. 1 is an "eye diagram" of the PAM4 signal. The eye diagram is a superimposed display of a plurality of waveforms obtained by sampling the waveform of the data signal over a symbol period a plurality of times. That is, in this FIG. 1, the horizontal axis corresponds to the time for each symbol, and the vertical axis corresponds to the amplitude (voltage amplitude in this case) of the PAM4 signal.

As shown in FIG. 1, according to the eye diagram of the PAM4 signal, three eyes, an eye 100h, an eye 100c, and an eye 100l, are formed from high voltage side toward low voltage side. Time ta indicates the time at which data are obtained in the symbol period. Then, a value cut-across the eye 100h at the time ta is set as threshold value Vthh. In addition, a value cut-across the eye 100c at the time ta is set as threshold value Vthc. Further, a value included in the eye 100l at the time ta is set as threshold value Vthl.

Thus, when each of the three threshold values is set to cut-across corresponding eye 100 at the time ta, it is possible to demodulate correct data from at least all waveforms that are origin of this eye diagram. The correct data means data with value equal to that of data before modulation. Data having different values from each other before the modulation and after the demodulation is designated as an error.

In this example, the eye 100h and the eye 100l do not have symmetry in the amplitude direction. Therefore, optimum points of Vthh and Vthl, that is, the threshold values for achieving the lowest bit error rate, vary depending on effects of channel loss, amplifier nonlinearity, equalizing, or DC offset, for example. Therefore, in particular, with regard to Vthh and Vthl, calibration is required to specify the optimum voltage values and set the specified optimum voltage values as the threshold value.

At the time of the calibration, for example, a plurality of voltage values are prepared as threshold value candidate values, and each of the candidate values is sequentially selected as a threshold value, and the demodulation is attempted. The demodulation of a large number of symbols is attempted for each candidate value. Then, the optimum point is determined from the candidate values based on the number of errors included in the demodulated data.

A technique of a comparative example will be described. According to the comparative example, when it is desired to achieve a BER of less than $10^{-14}$, the demodulation of at least $10^{14}$ symbols is attempted to determine whether or not each candidate value achieves a BER of less than $10^{-14}$. When no error is included in the demodulated data, it may be seen that the candidate values used at that time is able to achieve a BER of less than $10^{-14}$. When an error is included in the demodulated data, it may be seen that the candidate values used at that time may not be able to achieve a BER of less than $10^{-14}$. The optimum point is determined from the candidate values that achieve a BER of less than $10^{-14}$.

Here, for example, assuming that transmission speed of the PAM4 signal is 25.6 Gbps, it takes about 4000 seconds (=$10^{14}$*1/25.6 Gbps) to attempt the demodulation for each candidate value. That is, according to the comparative example, the number of symbols to be demodulated for each candidate value is large, so it takes much time for the calibration.

However, in the example embodiment, the receiving device intentionally degrades the eye diagram by adding jitter to a clock signal that defines the time ta. This degrades the BER, so that it is possible to reduce the number of symbols to be demodulated for each candidate value and thus shorten the time required for the calibration.

Figure 2:
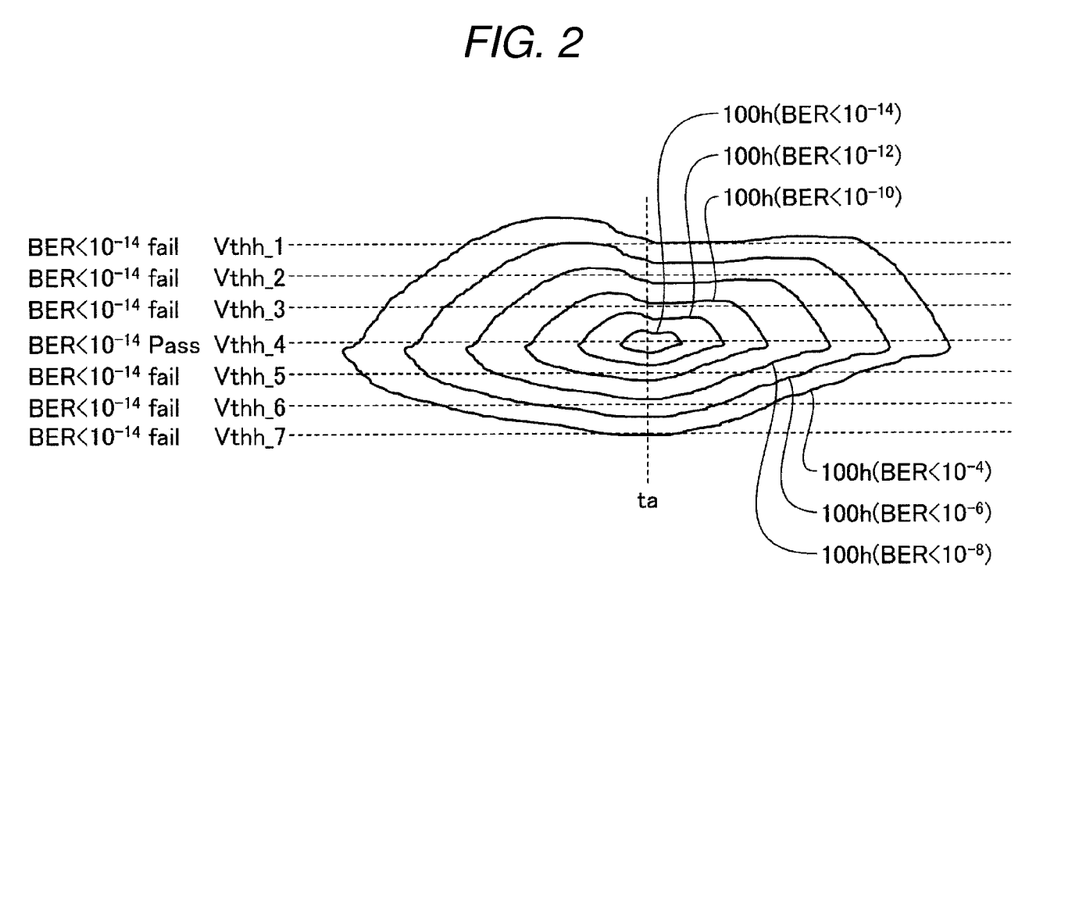
FIG. 2 is an eye diagram when no jitter is added to a clock signal for determining time ta.

The outline of the calibration method according to the embodiment will be described with reference to FIGS. 2 and 3. FIG. 2 is an eye diagram when no jitter is added to a clock signal for determining time ta in the comparative example. The time ta is adjusted to the optimal timing with respect to eye pattern. In FIG. 2, six eyes 100h are drawn for when the BER to be achieved is each of $10^{-4}$, $10^{-6}$, $10^{-8}$, $10^{-10}$, $10^{-12}$, and $10^{-14}$. When the BER to be achieved is lower, the eye 100h becomes smaller, so when a plurality of eyes 100h for different BERs are drawn, the eye diagram is depicted as contour lines as shown in FIGS. 2 and 3.

Here, when seven candidate values Vthh_1 to Vthh_7 are set, only Vthh_4 cut-across the eye 100h that achieves the smallest BER, that is, the BER of $10^{-14}$ (BER with the best performance). That is, it may be read that, Vthh_4 corresponds to the optimum point among the candidate values Vthh_1 to Vthh_7.

For example, when it is determined whether or not each candidate value can achieve BER less than $10^{-14}$ by performing the demodulation of at least $10^{14}$ symbols for each candidate value, only Vthh_4 passes a criteria to properly demodulate a data signal, so Vthh_4 can be specified as the optimum point.

Figure 3:
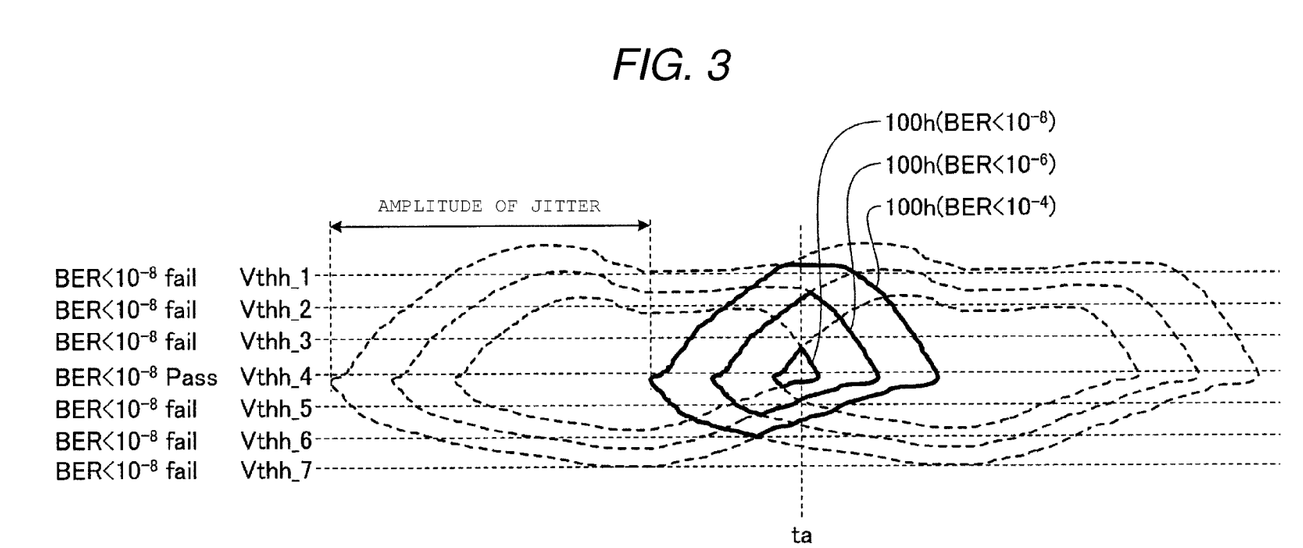
FIG. 3 is an eye diagram when the jitter is added to the clock signal for determining the time ta.

FIG. 3 is an eye diagram depicting when jitter is added to the clock signal for determining the time ta as in the present embodiment.

When the jitter is added to the clock signal for determining the time ta, the eye 100h appears to be blurred along the time axis direction by the time amount corresponding to the amplitude of the jitter. For each eye 100h, timing margin for jitter amplitude is reduced. As a result, each eye 100h shrinks and even disappears in some cases for lower BER levels.

In the example of FIG. 3, the eye 100h for achieving the BER of $10^{-4}$, $10^{-6}$, and $10^{-8}$ is reduced as compared with a case of FIG. 2. And the eyes for achieving BER less than $10^{-10}$ and lower have disappeared.

Here, however, among the seven candidate values Vthh_1 to Vthh_7, again only Vthh_4 cuts across the eye 100h achieving the smallest BER, that is, the BER of $10^{-8}$ (BER with the best characteristic) and thus corresponds to the optimum point.

Therefore, when it is determined whether or not each candidate value may achieve BER of less than $10^{-8}$ by performing the demodulation of at least $10^8$ symbols for each candidate value, only Vthh_4 passes the criteria, so Vthh_4 may be specified as the optimum point.

That is, by applying jitter to the clock signal for determining the time ta, even when the number of symbols demodulated for each candidate value is reduced from $10^{14}$ to $10^8$, Vthh_4 is still specified as the optimum point.

Hereinafter, a receiving device according to an embodiment will be described in which jitter is added to a clock signal for determining the time ta to specify an optimum point.

The receiving device according to the embodiment is mounted as a part of an analog front end circuit in a device on reception side of communication path when a signal modulated by pulse-amplitude modulation (PAM) is transmitted in any communication path such as a communication path between integrated circuits or a communication path between circuit boards.

Figure 4:
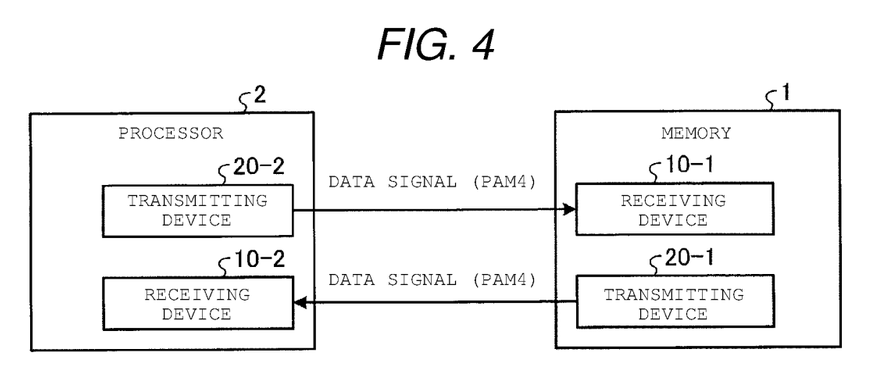
FIG. 4 is a schematic diagram showing an example of a system including a receiving device according to an embodiment.

FIG. 4 is a schematic view showing an example of a system in which the receiving device according to the embodiment is incorporated. In this example, the system includes a memory 1 and a processor 2.

The memory 1 includes a receiving device 10-1 and a transmitting device 20-1. The processor 2 includes a transmitting device 20-2 and a receiving device 10-2.

The receiving device 10-1 is connected to the transmitting device 20-2. The receiving device 10-1 may receive a PAM4 signal, which is a data signal modulated by PAM4, transmitted from the transmitting device 20-2.

In addition, the receiving device 10-2 is connected to the transmitting device 20-1. Then, the receiving device 10-2 may receive a PAM4 signal, which is the data signal modulated by PAM4, transmitted from the transmitting device 20-1.

The receiving device 10-1 and the receiving device 10-2 correspond to the receiving device according to the present embodiment. Hereinafter, the receiving device 10-1 and the receiving device 10-2 are each referred to as a receiving device 10.

The device on which the receiving device 10 is mounted, is not limited to memory 1 and processor 2. The receiving device 10 may be implemented in any device that receives a data signal modulated by pulse-amplitude modulation as part of an analog front end circuit on the reception side.

Figure 5:
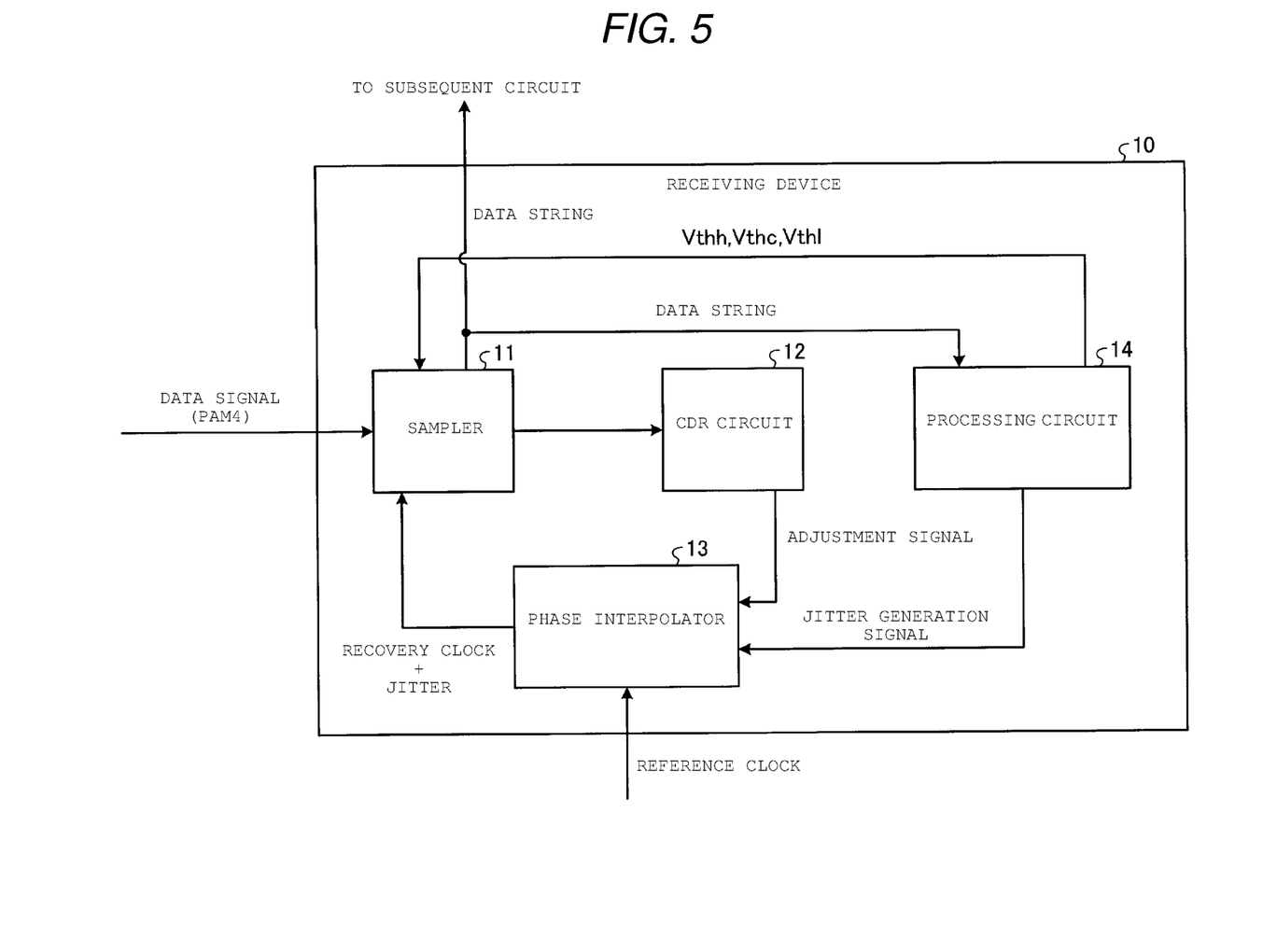
FIG. 5 is a schematic diagram showing a configuration of a receiving device according to an embodiment.

FIG. 5 is a schematic diagram showing a configuration of the receiving device 10 according to the present embodiment. The receiving device 10 includes a sampler 11, a clock data recovery (CDR) circuit 12, a phase interpolator 13, and a processing circuit 14. A CDR circuit 12 is an example of a first circuit. The phase interpolator 13 is an example of a second circuit. The sampler 11 is an example of a third circuit.

The CDR circuit 12 is a circuit block that calculates the phase difference between a reference clock and the data signal. More specifically, the CDR circuit 12 calculates a phase adjustment amount of the reference clock such that rising or falling edge of the reference clock is at a predetermined position of each eye 100 of the data signal in a symbol period. The predetermined position includes the maximum opening position of each eye 100 in a symbol period, and switching position of each symbol. The CDR circuit 12 outputs a digital value corresponding to the adjustment amount of the reference clock to the phase interpolator 13 as an adjustment signal.

The reference clock is an example of a first clock signal. The reference clock may be input from outside of the receiving device 10 as shown in FIG. 5. The receiving device 10 includes a clock generator such as a phase locked loop (PLL) circuit or a voltage-controlled oscillator (VCO), and the reference clock may be generated by the clock generator.

The phase interpolator 13 is a circuit block which may increase or decrease phase of clock. In this example, the phase interpolator 13 adjusts the phase of the reference clock input from the outside according to the adjustment signal input from the CDR circuit 12 and applies jitter based on a jitter generation signal input from processing circuit 14.

The jitter generation signal is a signal corresponding to a square wave or a sine wave which varies at a predetermined amplitude and a predetermined frequency with respect to zero, for example. The phase interpolator 13 adds the jitter generation signal and the adjustment signal, and adjusts the phase of the reference clock according to the amount obtained by the addition. The phase interpolator 13 may generate a "jittered" recovery clock because the jitter generation signal changes with the predetermined amplitude and the predetermined frequency with respect to zero. The amplitude and frequency of the jitter applied to the recovery clock correspond to the amplitude and frequency of the jitter generation signal.

The frequency of the jitter is higher than the response band of the CDR circuit 12. As a result, the adjustment of the phase difference by the CDR circuit 12 is not affected by the jitter.

The phase interpolator 13 inputs the recovery clock with the jitter to the sampler 11. The recovery clock with the jitter applied is an example of a second clock signal.

The sampler 11 compares the amplitude of the data signal (PAM4 signal) with the threshold values (Vthh, Vthc, and Vthl) at a timing synchronized with the clock input from the phase interpolator 13, that is, the recovery clock with the jitter applied to obtain a data string from the data signal. The sampler 11 demodulates data for each symbol period to obtain a group of data demodulated for each symbol period as a data string.

The sampler 11 outputs the obtained data string, as a received data string, to a subsequent circuit (not shown) configured in an apparatus including the receiving device 10. For example, the sampler 11a in the receiving device 10-1 sends the data string to another circuit in the memory 1. Further, the sampler 11b provided in the receiving device 10-2 sends the data string to another circuit provided in the processor 2.

The sampler 11 further inputs the obtained data string to the processing circuit 14.

Figure 6:
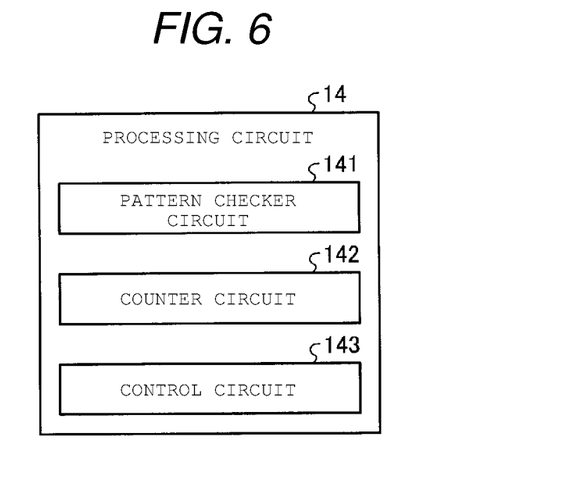
FIG. 6 is a schematic diagram of a processing circuit according to an embodiment.

FIG. 6 is a schematic diagram showing a more detailed configuration of the processing circuit 14 according to the embodiment. As shown in this FIG. 6, the processing circuit 14 includes a pattern checker circuit 141, a counter circuit 142, and a control circuit 143.

The pattern checker circuit 141 detects an error included in the data string input from the sampler 11.

For example, at the time of the calibration, the transmitting device 20 transmits a data signal obtained by modulating a predetermined training pattern by PAM4 to the receiving device 10. The pattern checker circuit 141 generates the same data pattern as the training pattern transmitted by the transmitting device 20. The pattern checker circuit 141 detects an error included in the data string by comparing the data string input from the sampler, that is, a demodulated training pattern, with a data pattern generated by itself.

The training pattern is a pseudo random bit sequence, for example. The pseudo random bit sequence is made by deterministic calculations. Therefore, when various conditions such as a generation equation are known, it is possible to generate the same pseudo random bit sequence. The pattern checker circuit 141 may generate the same data pattern as the pseudo random bit sequence transmitted by the transmitting device 20 by using the same generation equation as the generation equation used by the transmitting device 20.

The counter circuit 142 counts the number of errors (bit errors) detected by the pattern checker circuit 141.

The control circuit 143 is a circuit that controls an operation of the calibration. When controlling of the operation of the calibration, the control circuit 143 changes each of the threshold values (Vthh, Vthc, and Vthl) among a plurality of candidate values, selects the optimum point of each of the threshold values (Vthh, Vthc, and Vthl), or generates and outputs the jitter generation signal.

The control circuit 143 may adjust the amplitude of the jitter applied to the recovery clock by adjusting the amplitude of the jitter generation signal.

For example, when the amplitude of the jitter applied to the recovery clock is too large, the eye diagram may be too greatly deteriorated, and all candidate values may therefore be rejected. In such a case, the control circuit 143 reduces the amplitude of the jitter applied to the recovery clock. As a result, it possible to improve the eye diagram and find candidate values that pass the criteria.

When the number of errors detected in one round of verification reaches a predetermined number, the control circuit 143 ends the verification and performs the next round of verification. As a result, the time required for calibration is further reduced.

Next, the operation of the receiving device 10 according to the embodiment will be described.

Figure 7:
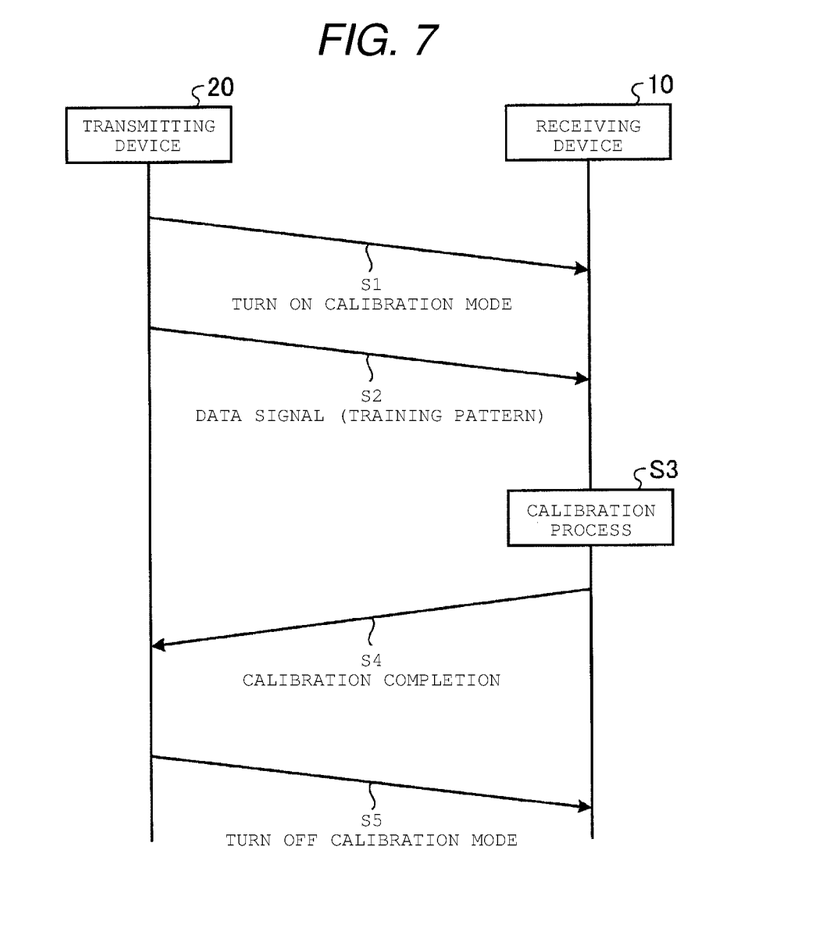
FIG. 7 is a timing chart illustrating information communicated between a transmitting device and a receiving device according to an embodiment.

FIG. 7 is a timing chart illustrating an example of information communicated between the transmitting device 20 and the receiving device 10 according to the present embodiment.

At the time of calibration, the transmitting device 20 transmits a signal (S1) instructing the receiving device 10 to turn on (or operate in) calibration mode. Subsequently, the transmitting device 20 transmits a data signal (S2) obtained by modulating a training pattern with PAM4.

When being instructed to operate in the calibration mode by signal S1 and receiving the data signal S2, the receiving device 10 performs calibration in a calibration process (S3).

When the calibration is completed, the receiving device 10 transmits to the transmitting device 20 of a completion of the calibration notice (S4). Upon receiving the transmission of the completion of the calibration notice (S4), the transmitting device 20 transmits a signal (S5) instructing the end of the operation in the calibration mode to the receiving device 10. As a result, the communication of information on calibration is completed.

It should be noted that the operations of FIG. 7 may be performed before shipping of the receiving device 10, or may be performed after shipping of the receiving device 10.

Figure 8:
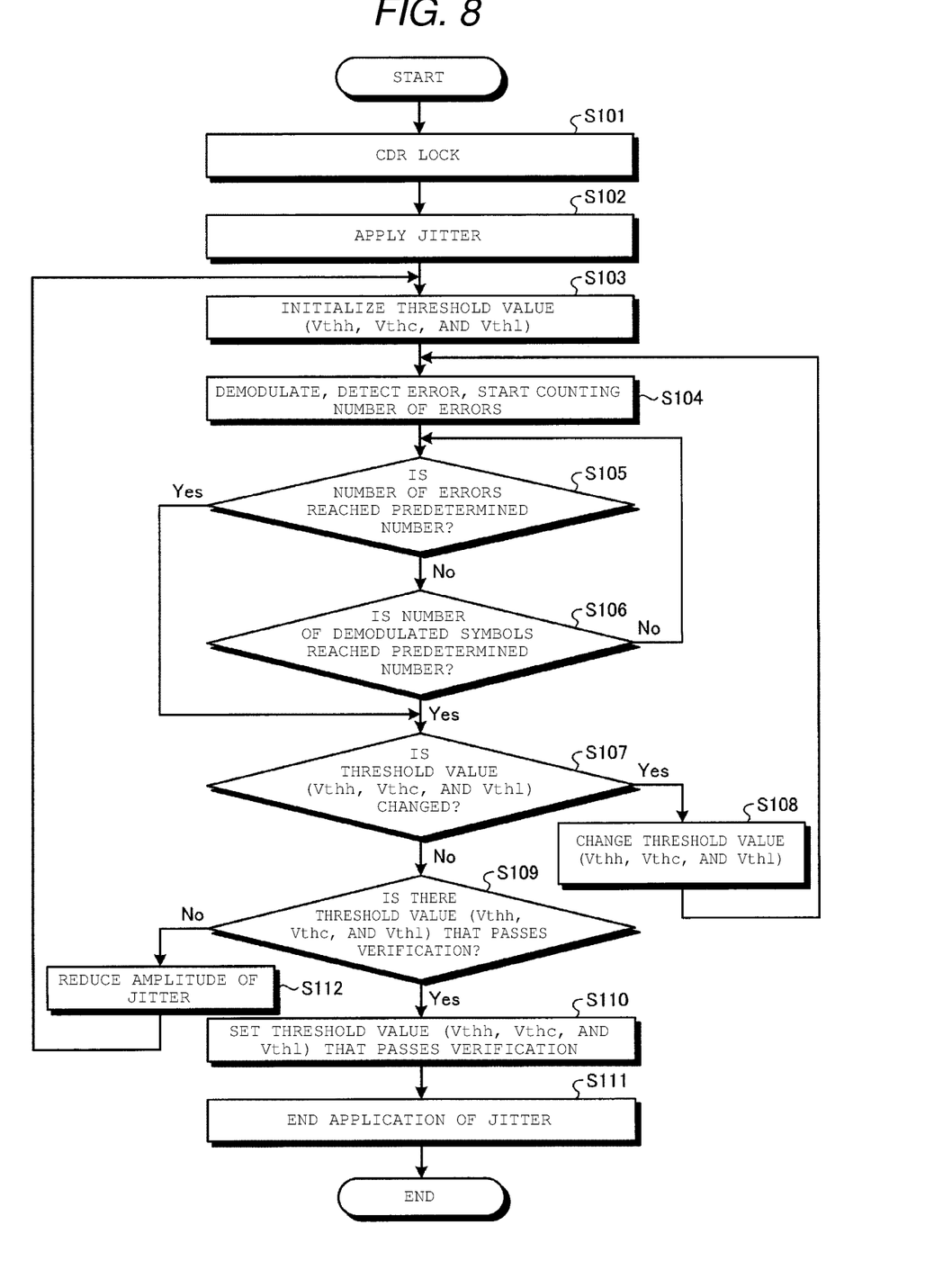
FIG. 8 is a flowchart illustrating an example of a calibration process performed by a receiving device according to an embodiment.

FIG. 8 is a flowchart illustrating an example of the operation of the calibration process performed by the receiving device 10 according to the embodiment. In the description of this FIG. 8, the threshold value refers to each of Vthh, Vthc, and Vthl. Further, changing the threshold value means changing at least one of Vthh, Vthc, and Vthl.

When the calibration process starts, the CDR circuit 12 first obtains the adjustment amount for the phase difference between the reference clock and the data signal, and locks the phase of the reference clock with respect to the data signal (S101). The CDR circuit 12 sends a digital value corresponding to the adjustment amount to the phase interpolator 13 as the adjustment signal.

The control circuit 143 in the processing circuit 14 inputs the jitter generation signal to the phase interpolator 13. As a result, the phase interpolator 13 applies the jitter to the recovery clock (S102).

The control circuit 143 further initializes the threshold value used by the sampler 11 (S103). That is, the control circuit 143 sets each of Vthh, Vthc, and Vthl to an initial value set in advance. The initial value is one of a plurality of prepared candidate values, for example.

Subsequently, the verification of the set threshold value is started. That is, the sampler 11 starts the demodulation of the data signal by using the initial threshold values, the pattern checker circuit 141 starts detecting an error included in the data string obtained by demodulation, and the counter circuit 142 starts counting the number of detected errors (S104).

When the verification is started, the control circuit 143 determines whether or not the number of detected errors, that is, the result of count by the counter circuit 142 reaches a predetermined number (S105).

If the number of detected errors does not reach a predetermined number (S105: No), the control circuit 143 determines whether or not the number of demodulated symbols has reached a predetermined number (S106). It should be noted that, $10^8$ is set as the predetermined number in the case of FIG. 3, for example.

If the number of demodulated symbols does not reach the predetermined number (S106: No), the control circuit 143 executes the determination process of S105 again.

If the number of detected errors reaches the predetermined number (S105: Yes), or if the number of demodulated symbols reaches a predetermined number (S106: Yes), the control circuit 143 ends the verification, and determines whether or not the threshold value is to be changed (S107).

A plurality of candidate values are prepared for each of Vthh, Vthc, and Vthl. For example, when there is a combination of candidate values not used for the verification, the control circuit 143 determines that the threshold value is to be changed. When the verification is completed with respect to all combinations, the control circuit 143 determines that the threshold value is not changed.

When it is determined that the threshold value is to be changed (S107: Yes), the control circuit 143 changes the threshold value to a combination of candidate values not used for the verification (S108). Then, the process proceeds to S104 and the verification of the changed threshold value is started.

When it is determined that the threshold value is not changed (S107: No), the control circuit 143 determines whether or not there is a threshold value that passes the criteria (S109). When there is a threshold value that passes the criteria (S109: Yes), the control circuit 143 specifies the threshold value that passes the criteria as the optimum point, and sets it in the sampler 11 (S110). Then, the control circuit 143 stops the application of the jitter to the recovery clock by stopping the generation or the output of the jitter generation signal (S111), and ends the operation of the calibration process.

After completion of the operation of the calibration, the sampler 11 may demodulate the data signal by using the threshold values (Vthh, Vthc, and Vthl) specified as the optimum points.

When there is no threshold value that passes the criteria (S109: No), the control circuit 143 reduces the amplitude of the jitter (S112). Then, the process proceeds to S103, and the verification of all combinations of candidate values is performed again.

Thus, according to the embodiment, the CDR circuit 12 adjusts the phase difference between the reference clock and the data signal which is a signal modulated by PAM4. The phase interpolator 13 adds jitter to the recovery clock obtained by adjusting the phase difference. The sampler 11 obtains the data string from the data signal by comparing the amplitude of the data signal with the threshold values (Vthh, Vthc, and Vthl) at a timing synchronized with the recovery clock with the jitter added. The processing circuit 14 counts errors included in the data string and calibrates the threshold value based on the result of counting the errors.

The receiving device 10 configured as described above may reduce the number of symbols to be demodulated in one round of verification. As a result, the time required for calibration may be reduced.

According to the embodiment, specifically, the processing circuit 14 changes the threshold value when the amount of the data string, that is, the number of the demodulated symbols reaches a predetermined number, and counts errors each time the threshold is changed. That is, each of a plurality of candidate values is set as a threshold value, and the verification is performed for each candidate value.

Further, according to the embodiment, the processing circuit 14 specifies, as the optimum point, a candidate value which passes the criteria of a plurality of candidate values, that is, a candidate value in which no error is detected and selects as the threshold value after calibration.

The criterion for passing are not limited to the fact that no error is detected. The processing circuit 14 may consider it passes the criteria, when the detected number of errors is equal to or less than a predetermined number. Further, the processing circuit 14 may select a candidate value having the smallest number of detected errors among the plurality of candidate values as a threshold value after calibration. In addition, when a plurality of candidate values having the smallest number of detected errors are obtained, the processing circuit 14 may select an intermediate value of the plurality of candidate values having the smallest number of detected errors as the threshold value after calibration. In addition to the candidate value having the smallest number of errors detected, when there is another candidate value having the number of errors detected being close to the candidate value, the processing circuit 14 may select an intermediate value between the candidate value having the smallest number of detected errors and another candidate value as the threshold value after calibration.

Further, according to the embodiment, the processing circuit 14 reduces the amplitude of the jitter when there is no candidate value that passes the criteria.

As a result, it possible to find candidate values that pass the criteria.

Further, according to the embodiment, the processing circuit 14 changes the threshold value when the number of demodulated symbols reaches a predetermined number or when the number of detected errors reaches a predetermined number.

As a result, when it is clear that the set threshold value does not correspond to the optimum point, such as when a large number of errors are detected during the verification, the verification is ended during the verification and the threshold value may be changed to start the next round of verification. That is, the time required for calibration may be further shortened.

In the above, it is described that the case where PAM4 is used as an example of pulse-amplitude modulation. The present disclosure is applicable even when pulse-amplitude modulation capable of transmitting data of 3 or more bits per symbol is employed. Furthermore, the present disclosure is applicable even when pulse-amplitude modulation capable of transmitting one bit of data per symbol is employed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the disclosures.

What is claimed is:

1. A receiving device, comprising:
   a first circuit configured to calculate a phase difference between a first clock signal and a data signal modulated by pulse-amplitude modulation;
   a second circuit configured to generate a second clock signal based on the first clock signal and the phase difference, and to add jitter to the second clock signal;
   a third circuit configured to demodulate the data signal by comparing an amplitude of each pulse of the data signal with a threshold value at a timing synchronized to the second clock signal added the jitter; and
   a processing circuit configured to count a number of errors in the demodulated data signal and calibrate the threshold value based on the counted number of errors.

2. The receiving device according to claim 1, wherein the processing circuit is further configured to adjust the threshold value, clear the counted number of errors, and repeat the demodulation of the data signal with the adjusted threshold value if a data size of the demodulated data signal reaches a particular size.

3. The receiving device according to claim 2, wherein the processing circuit is further configured to select the threshold value from a plurality of candidate threshold values.

4. The receiving device according to claim 3, wherein the processing circuit is further configured to reduce an amplitude of the jitter when the plurality of candidate threshold values do not include any candidate that satisfies a predetermined criterion, and repeat the demodulation of the data signal with reduced jitter.

5. The receiving device according to claim 2, wherein the processing circuit is further configured to adjust the threshold value, clear the counted number of errors, and repeat the demodulation of the data signal with the adjusted threshold value if the counted number of errors reaches a predetermined value before the data size has reached the predetermined size.

6. The receiving device according to claim 1, wherein the data signal includes a plurality of bits of data per symbol.

7. The receiving device according to claim 1, wherein
   the processing circuit is further configured to generate a jitter generation signal, and
   the second circuit is configured to add jitter, to the first clock signal, having an amplitude being set based on the jitter generation signal.

8. The receiving device according to claim 7, wherein
   the first circuit is configured to generate an adjustment signal based on the phase difference calculated, and
   the second circuit is configured to adjust the phase difference based on the adjustment signal generated by the first circuit.

9. The receiving device according to claim 8, wherein the second circuit is configured to add a first value corresponding to the jitter generation signal to a second value corresponding to the adjustment signal, and adjust a phase of the second clock signal based on a third value corresponding to an addition of the first value and the second value.

10. The receiving device according to claim 1, wherein the jitter has a frequency that is higher than a response band of the first circuit.

11. A method of signal demodulation, the method comprising:
    calculating a phase difference between a first clock signal and a data signal modulated by pulse-amplitude modulation;
    generating a second clock signal based on the first clock signal and the calculated phase difference, and adding jitter to the second clock signal added the jitter;
    demodulating the data signal by comparing an amplitude of each pulse of the data signal with a threshold value at a timing synchronized to the second clock signal;
    counting a number of errors in the demodulated data signal; and
    performing calibration of the threshold value based on the counted number of errors.

12. The method according to claim 11, wherein the calibration comprises:
    adjusting the threshold value, clearing the counted number of errors, and repeating the demodulation of the data signal with the adjusted threshold value if a data size of the demodulated data signal reaches a particular size.

13. The method according to claim 12, wherein the calibration further comprises:
    selecting the threshold value from a plurality of candidate threshold values.

14. The method according to claim 13, wherein the calibration further comprises:
    reducing an amplitude of the jitter when the plurality of candidate threshold values do not include any candidate that satisfies a predetermined criterion; and
    repeating the demodulation of the data signal with reduced jitter.

15. The method according to claim 12, wherein the calibration further comprises:
    adjusting the threshold value, clearing the counted number of errors, and repeating the demodulation of the data signal with the adjusted threshold value if the counted number of errors reaches a predetermined value before the data size has reached the predetermined size.

16. The method according to claim 11, wherein the data signal includes a plurality of bits of data per symbol.

17. The method according to claim 11, further comprising:
    generating a jitter generation signal; and
    adding jitter, to the first clock signal, having an amplitude being based on the jitter generation signal.

18. The method according to claim 17, further comprising:
    generating an adjustment signal based on the calculated phase difference; and
    adjusting the phase difference based on the adjustment signal.

19. The method according to claim 18, further comprising:
 adding a first value corresponding to the jitter generation signal to a second value corresponding to the adjustment signal; and
 adjusting a phase of the second clock signal based on a third value corresponding to an addition of the first value and the second value.

20. The method according to claim 11, wherein the jitter has a frequency that is higher than a response band of the calculating the phase difference.

* * * * *